United States Patent [19]

Chen

[11] Patent Number: 5,435,269
[45] Date of Patent: Jul. 25, 1995

[54] MULTI-FUNCTION APPARATUS FOR CARING FOR PETS

[76] Inventor: Yen-Liang Chen, No. 116, Sec. 1, Ching-Hai Rd., Hsi-Tun Dist., Taichung City, Taiwan

[21] Appl. No.: 315,073

[22] Filed: Sep. 29, 1994

[51] Int. Cl.⁶ ............ A01K 29/00; A01K 13/00
[52] U.S. Cl. .................................... 119/158
[58] Field of Search ............. 119/158, 700, 19

[56] References Cited

U.S. PATENT DOCUMENTS 4,505,229  3/1985  Altissimo .............. 119/158
4,938,469  7/1990  Crandell ............. 119/700 X Primary Examiner—Gene Mancene
Assistant Examiner—Thomas Price
Attorney, Agent, or Firm—Sughrue, Mion, Zinn, Macpeak and Seas

[57] ABSTRACT

A multi-function apparatus for caring a pet includes an enclosed housing which has an upper chamber with an openable top wall, a lower chamber with a bottom base for accommodating the pet, a door for access into the lower chamber, and a separation plate mounted between the upper and lower chambers. The separation plate has a first and a second opening communicating the upper and lower chambers. A treading exercise device is mounted on the bottom base and includes a driving wheel, driven wheels, an endless belt passing over the driving and driven wheels, and a motor connected to the driving wheel. A drying device is mounted in the upper chamber and includes at least one blower which incorporates an electric heating element for heating air and blowing heated air into the lower chamber via the first opening. A warming device includes a ventilating fan provided in the upper chamber adjacent to the second opening, and an air heater mounted in the lower chamber below the ventilating fan.

9 Claims, 7 Drawing Sheets

MULTI-FUNCTION APPARATUS FOR CARING FOR PETS

BACKGROUND OF THE INVENTION

1. Field of the Invention

This invention relates to an apparatus for caring for a pet, more particularly to a multi-function apparatus for caring for or grooming a pet.

2. Description of the Related Art

In order to take care of a pet, such as a cat or a dog, a cage for accommodating the pet, a hair dryer, a heated water supplying device for bathing the pet, a warming chamber for maintaining the temperature of the pet's body at appropriate levels, etc. are required. Furthermore, an indoor exercise device for the pet may also be necessary. It is inconvenient and uneconomical to conduct the preparation of these devices since these devices are generally manufactured and sold individually.

SUMMARY OF THE INVENTION

The objective of this invention is to provide a multi-function apparatus which incorporates a variety of devices so as to provide different caring functions for a pet.

The multi-function apparatus according to this invention includes an enclosed housing. The housing has an upper chamber with an openable top wall, a lower chamber with a bottom base for accommodating a pet, a door for access into the lower chamber, and a separation plate mounted between the upper chamber and the lower chamber. The separation plate has a first and a second opening communicating the upper chamber and the lower chamber.

A treading exercise device is mounted on the bottom base and includes a driving wheel, at least one driven wheel, an endless belt passing over the driving wheel and the driven wheel, and a motor connected to the driving wheel for actuating the driving wheel.

A drying device is mounted in the upper chamber and includes at least one blower which incorporates an electric heating element therein for heating air and for blowing the heated air into the lower chamber via the first opening of the separation plate.

A warming device includes a ventilating fan provided in the upper chamber adjacent to the second opening of the separation plate, and an air heater mounted in the lower chamber below the ventilating fan for heating air in the lower chamber.

The multi-function apparatus may include a hair dryer which is mounted in the upper chamber and which has an air pipe extending outwardly of the housing.

The multi-function apparatus may further include a water heating device which is mounted in the upper chamber and which includes a water inlet, an inlet pipe connected to the water inlet, a water outlet and an outlet pipe extending from the water outlet and outwardly of the housing.

A support plate may be provided removably on the endless belt, and a grill member may be provided removably on the support plate.

A grill member may be provided removably on the top wall, and an upright rod may be mounted on the top wall.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENTS

Figure 1:
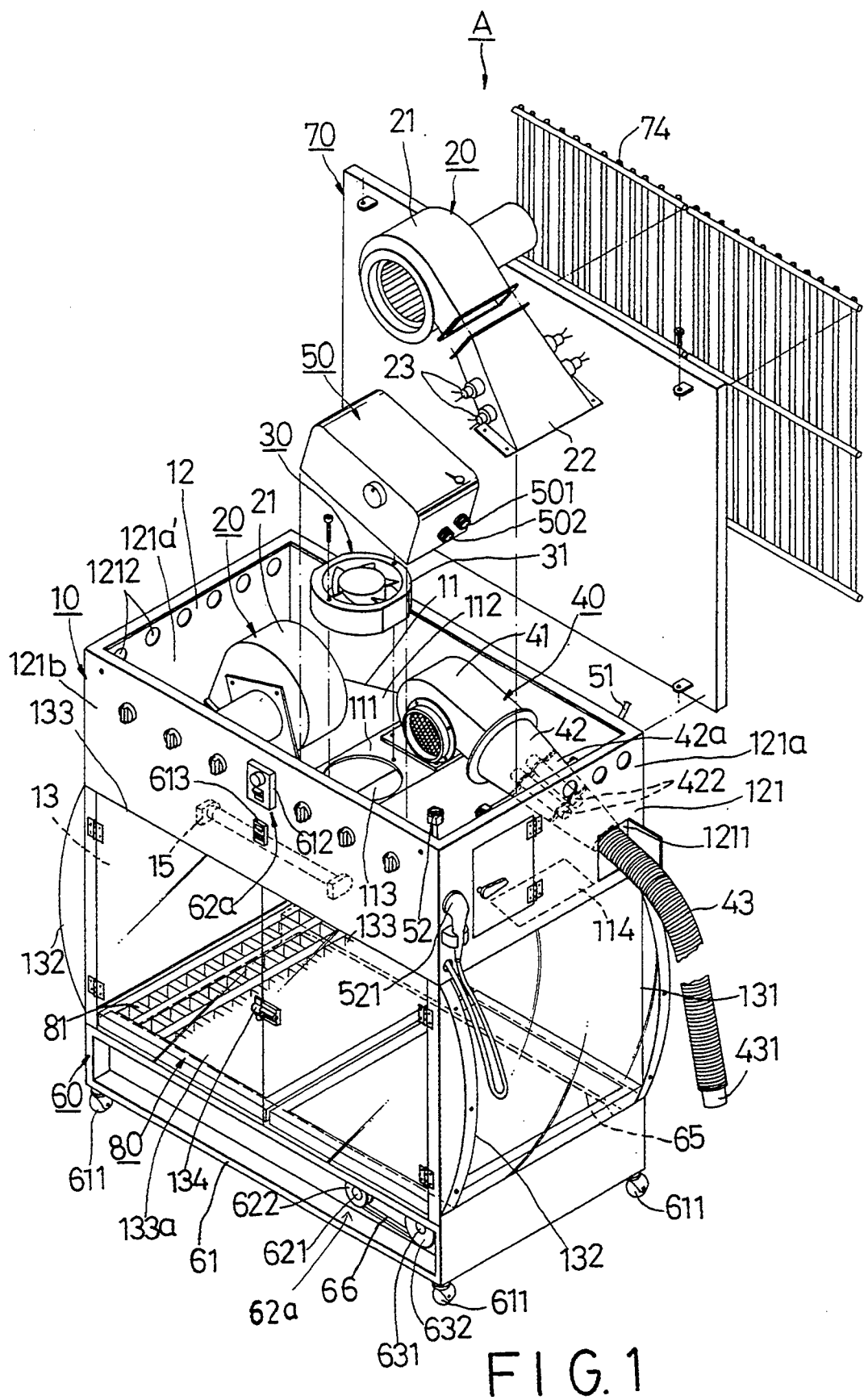
FIG. 1 is an exploded view of a multi-function apparatus of this invention.
Figure 2:
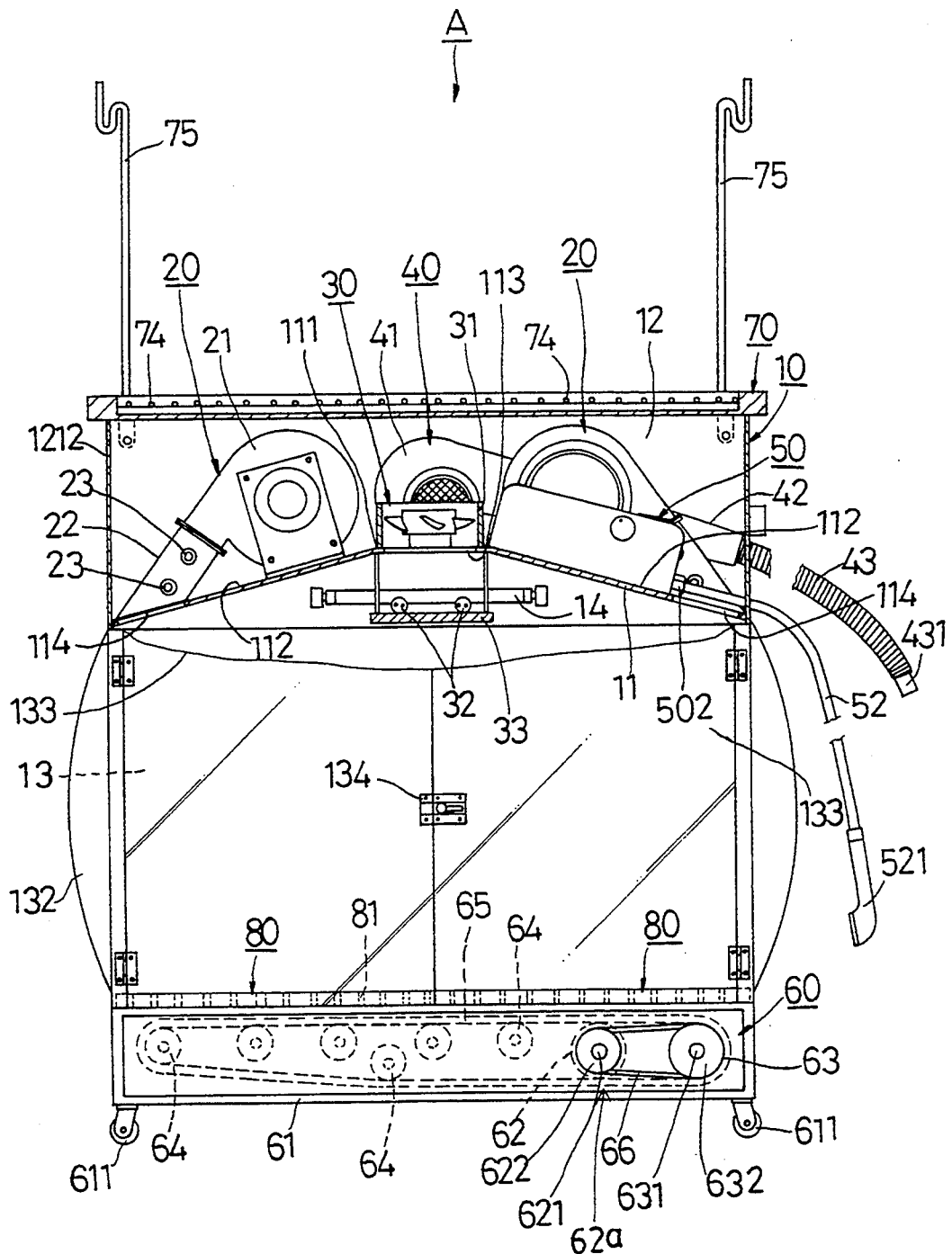
FIG. 2 is a front view of the multi-function apparatus of this invention.

Referring to FIGS. 1 and 2, a multi-function apparatus (A) according to this invention for caring for a pet includes an enclosed housing 10 which has an upper chamber 12, a lower chamber 13 for accommodating the pet, and a separation plate 11 mounted between the upper chamber 12 and the lower chamber 13. A stainless surrounding wall 121 and an openable top wall 70 confine the upper chamber 12. The surrounding wall 121 includes two opposite side portions (121a, 121a') and a front portion (121b). The side portions (121a, 121a') are formed with a plurality of ventilation holes 1212. A stainless rear wall 131, a pair of transparent and curved side walls 132, a front door (133a), and a bottom base 61 confine cooperatively the lower chamber 13. The front door (133a) has two transparent door plates 133 and a locking member 134. The separation plate 11 includes an upper horizontal portion 111 formed with a circular opening 113, and two inclined portions 112, each of which is formed with a rectangular opening 114. Four wheels 611 are mounted to an outer wall of the bottom base 61.

A treading exercise device 60 is mounted on the bottom base 61 and includes a driving wheel 63, a plurality of driven wheels 64 arranged spacedly, and an endless belt 65 passing over the driving wheel 63 and the driven wheels 64. The driving wheel 63 is associated with a shaft 631 and a coaxial driven wheel 632. A control unit (62a) for controlling the operation of the driving wheel 63 includes a motor 62, a transmission shaft 621, a transmission wheel 622, and a transmission belt 66 passing over the transmission wheel 622 and the driven wheel 632. The control unit (62a) further includes a speed adjustment mechanism 612 and a timer 613 which are mounted at the front portion (121b) of the surrounding wall 121. A support plate 80 is provided removably on the endless belt 65. A wooden grill member 81 is provided removably on the support plate 80.

A drying device 20 is mounted in the upper chamber 12 and includes two blowers 21 fixed to the inclined portions 112 of the separation plate 11. Each of the blowers 21 has a barrel 22 connected to a respective one of the openings 114 and a pair of electric heating elements 23 mounted in the barrel 22. The electric heating element 23 can be a heater.

A warming device 30 includes a ventilating fan 31 mounted in the upper chamber 12 at the horizontal portion 111 of the separation plate 11 and adjacent to the opening 113. The ventilating fan 31 is rotatable in a clockwise and in an anticlockwise direction. The warming device 30 further includes a pair of air heaters 32 which are mounted in the lower chamber 13 at a support frame 33 and below the ventilating fan 31 for heating the air in the lower chamber 13.

A hair dryer 40 is mounted in the upper chamber 12. The hair dryer 40 includes a blower 41 fixed to the separation plate 11, and an air pipe (42a) extending from the blower 41 and outwardly of the housing 10 via an opening 1211 in the side portion (121a) of the surroundingwall 121. The air pipe (42a) has an upper conducting portion 42 incorporating two electric heating elements 422, an intermediate bellows-like portion 43, and a lower rigid portion 431.

A water heating device 50 is mounted in the upper chamber 12 and includes a water inlet 501, a water outlet 502, an inlet pipe 51 connected to the water inlet 501, and an outlet pipe 52 connected to the water outlet 502. The outlet pipe 52 extends outwardly of the housing 10 and is associated with a portable shower head 521.

The top wall 70 of the housing 10 can be provided with a grill member 74. A pair of upright rods 75 are mounted to the top wall 70 and have hook portions for tying the pet.

An ultraviolet lamp 14 is provided in the lower chamber 13 for sterilization, and an illuminating lamp 15 is also provided in the lower chamber 13.

Figure 3:
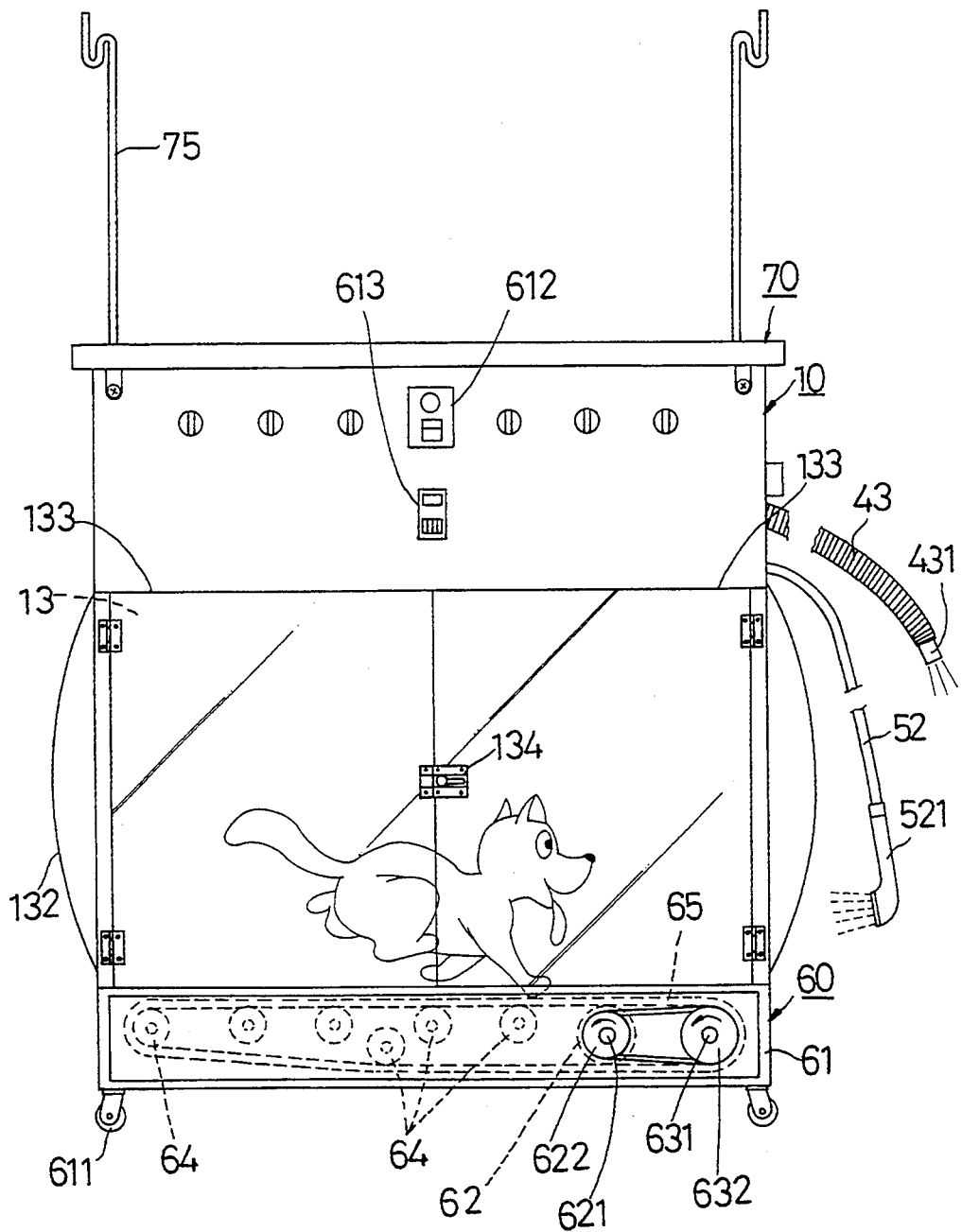
FIG. 3 is a schematic view showing the operation of a treading exercise device of the multi-function apparatus.
Figure 4:
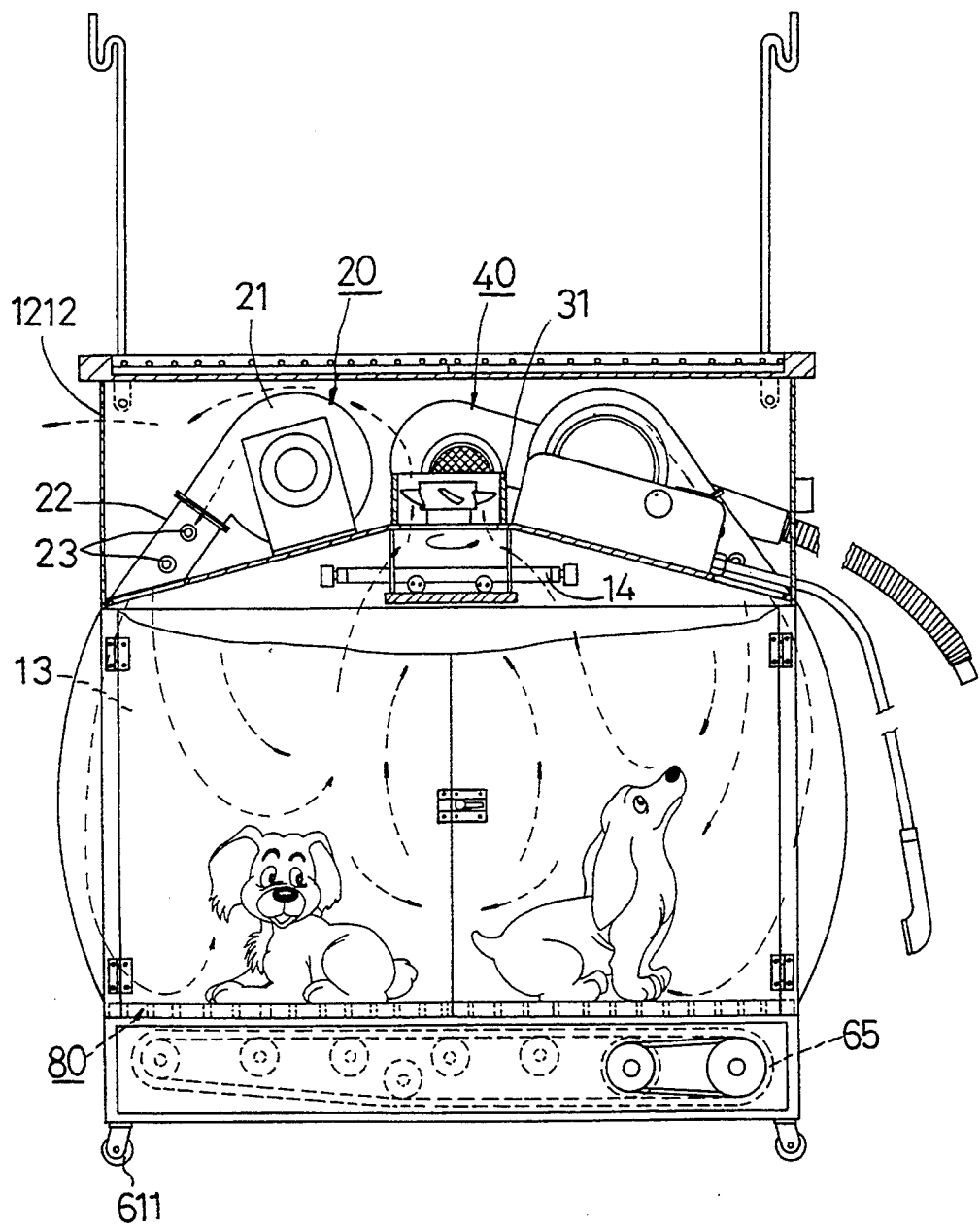
FIG. 4 is a schematic view showing the operation of a drying device of the multi-function apparatus.

Referring to FIG. 3, the water heating device 50 can be actuated to supply hot water for bathing the pet. After bathing, the hair dryer 40 is actuated to dry the pet's hair. Referring to FIG. 4, after the use of the hair dryer 40, the pet may be placed in the lower chamber 13, and the blowers 21 may be turned on for further drying of the pet's hair with gentle heat. At the same time, the ventilating fan 31 is caused to rotate in the anticlockwise direction by the heated air current, thereby discharging rising heated air from the housing 10 via the ventilation holes 1212.

Referring to FIG. 3, the treading exercise device 60 can be used for the pet's indoor exercise. When using the treading exercise device 60, the support plate 80 and the grill member 81 are removed from the housing 10. The pet, such as a dog, is placed in the lower chamber 13 on the endless belt 65, and the motor 62 is actuated to cause rotation of the endless belt 65. The rotation speed and the running time can be controlled by the use of a speed adjustment mechanism 612 and a timer 613.

Figure 5:
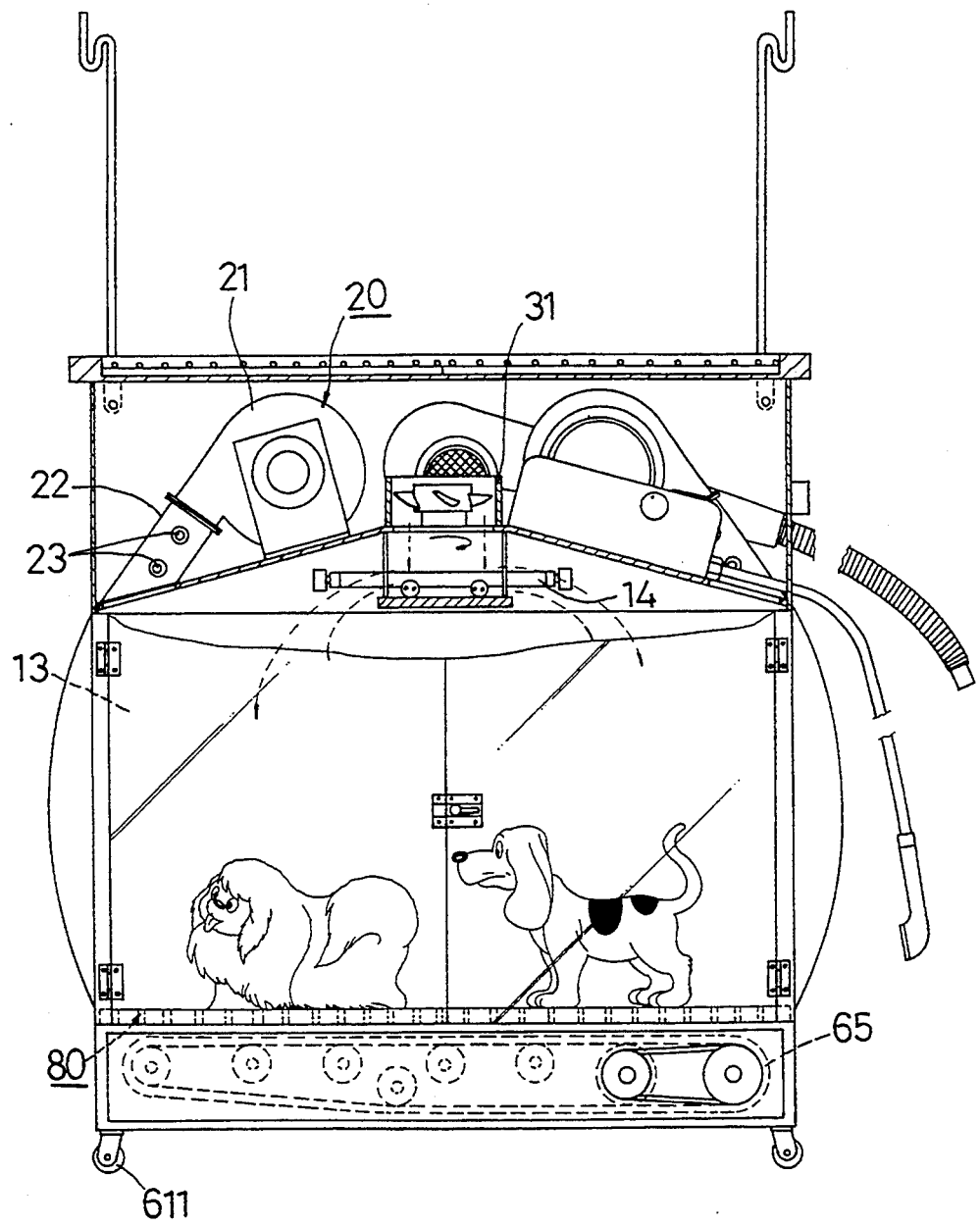
FIG. 5 is a schematic view showing the operation of a warming device of the multi-function apparatus.

Referring to FIG. 5, the ventilating fan 31 is actuated to rotate in the clockwise direction to draw air into the lower chamber 13, and the air heaters 32 are actuated so as to heat the air in the lower chamber 13. In this way, a warm environment can be provided in the lower chamber 13. At the same time, the ultraviolet lamp 14 can be turned on for sterilization. Such a warm environment is suitable for a new-born animal.

Figure 6:
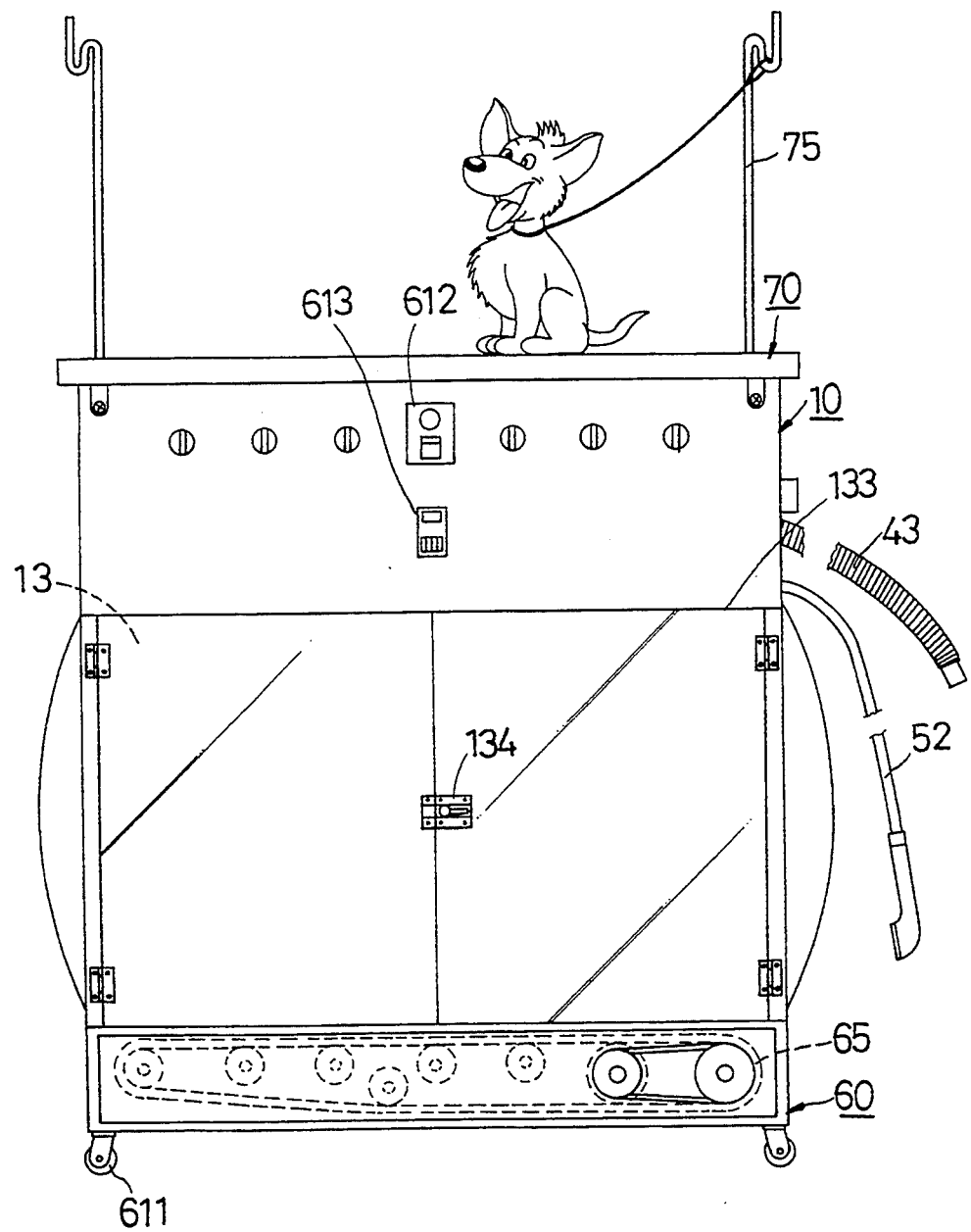
FIG. 6 is a schematic view showing the use of a top wall of a housing of the multi-function apparatus.

Referring to FIG. 6, the top wall 70 of the housing 10 can be used as a working table. The dog rests on the top wall 70 and is tied to the rod 75 for hair cutting purposes.

Figure 7:
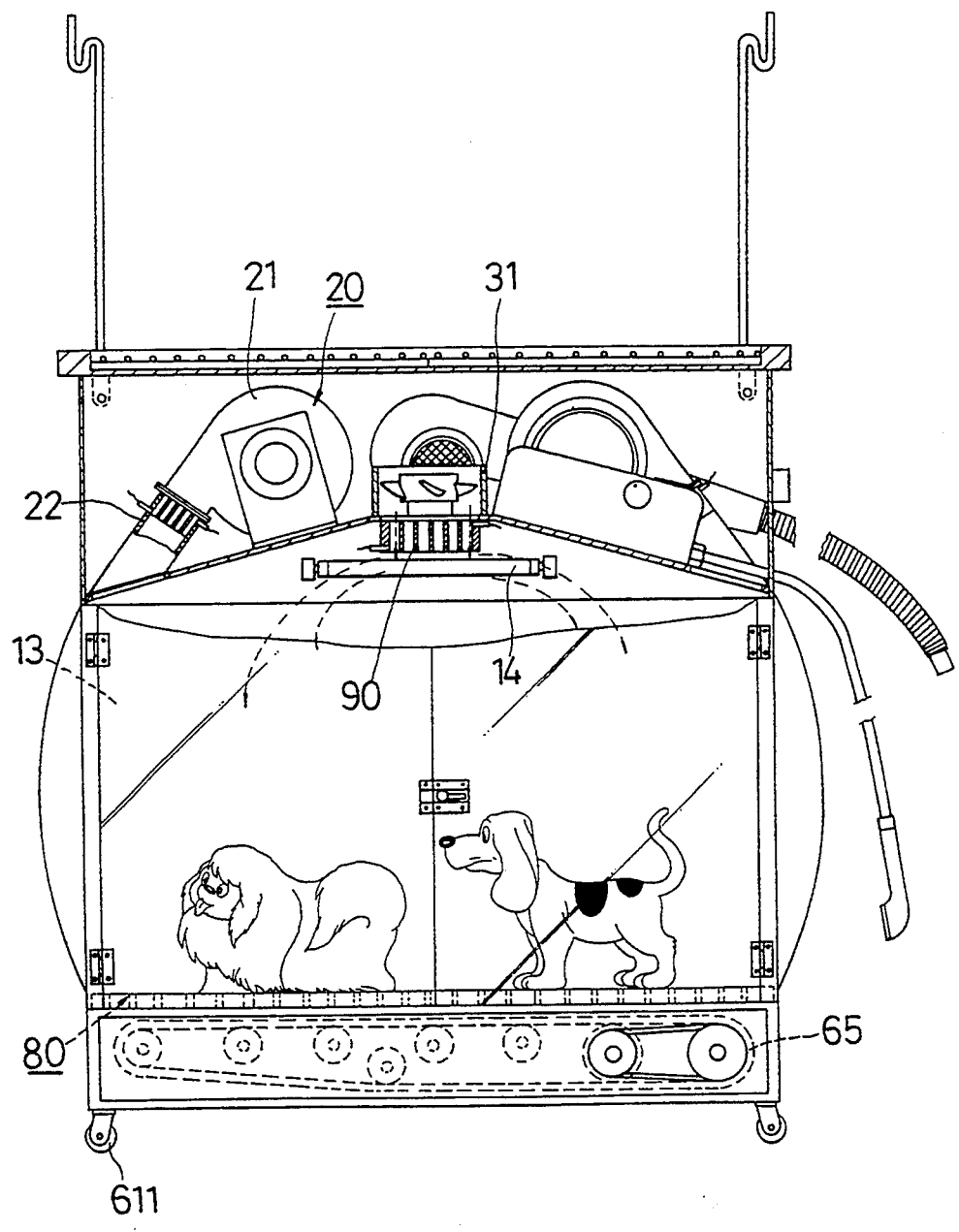
FIG. 7 is a schematic view showing the operation of a far-infrared heater mounted in the housing of this invention.

Referring to FIG. 7, since the radiation of far-infrared ray is healthy for the pet, the lower chamber 13 of the housing 10 can be further provided with a known far-infrared heater 90. Furthermore, the electric heating elements 23 of the drying device 20, the air heaters 32 of the warming device 30, and the electric heating elements 422 of the hair dryer 40 can be far-infrared heaters.

Accordingly, it is convenient and economical to conduct the preparation of different caring functions for a pet with the use of the multi-function apparatus (A) of this invention.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A multi-function apparatus for caring for a pet, said apparatus comprising:

a housing having an upper portion, a lower enclosed pet chamber with a bottom base for accommodating the pet and a door for access thereinto, and a ventilation unit adjacent said upper portion for ventilating said pet chamber; and a treadmill device mounted on said bottom base, and having an endless belt, and means for driving said endless belt to move, said endless belt having a width substantially equal to a width of said bottom base and a length substantially equal to a length of said bottom base, wherein said housing is configured to force a pet to remain on said endless belt when said endless belt is stationary and to force said pet to walk or run on said endless belt in a unidirectional orientation when said endless belt is driven to move.

2. A multi-function apparatus as claimed in claim 1, further comprising a hair dryer mounted in said upper portion and having an air pipe extending outwardly of said housing.

3. A multi-function apparatus as claimed in claim 2, further comprising a water heating device mounted in said upper portion and including a water inlet, an inlet pipe connected to said water inlet, a water outlet, and an outlet pipe extending from said water outlet outwardly of said housing.

4. A multi-function apparatus as claimed in claim 3, wherein said housing has an openable top wall covering said upper portion, and a first grill member provided removably on said top wall.

5. A multi-function apparatus as claimed in claim 4, further comprising a support plate provided removably on said endless belt, and a second grill member provided removably on said support plate.

6. A multi-function apparatus as claimed in claim 4, further comprising an upright rod mounted on said top wall.

7. A multi-function apparatus as claimed in claim 1, wherein said housing includes a separation plate mounted between said upper portion and said pet chamber and having at least one opening communicating said upper portion and said pet chamber, said ventilation unit including a ventilating fan provided in said upper portion for supplying air to said pet chamber via said opening in said separation plate.

8. A multi-function apparatus as claimed in claim 7, wherein said pet chamber includes a surrounding wall connected to said separation plate and said bottom base, said surrounding wall having a stainless steel wall portion and a transparent wall portion.

9. A multi-function apparatus as claimed in claim 8, further comprising a blower for blowing hot air into said pet chamber via said opening in said separation plate.

* * * * *